(12) United States Patent
Jozokos

(10) Patent No.: US 11,692,817 B2
(45) Date of Patent: *Jul. 4, 2023

(54) ALIGNMENT OF ROTATIONAL SHAFTS

(71) Applicant: Shoreline Alignment & Vibration, LLC, Windham, NH (US)

(72) Inventor: Deron Jozokos, Windham, NH (US)

(73) Assignee: Shoreline Alignment & Vibration, LLC, Windham, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,389

(22) Filed: Apr. 4, 2022

(65) Prior Publication Data

US 2022/0268575 A1   Aug. 25, 2022

Related U.S. Application Data

(63) Continuation of application No. 16/658,072, filed on Oct. 19, 2019, now Pat. No. 11,300,404.

(Continued)

(51) Int. Cl.
*G01B 11/27* (2006.01)
*G01B 5/25* (2006.01)
(Continued)

(52) U.S. Cl.
CPC .......... *G01B 11/272* (2013.01); *F01D 25/285* (2013.01); *G01B 5/25* (2013.01); *F16B 2001/0035* (2013.01)

(58) Field of Classification Search
CPC ....... G01B 11/272; G01B 5/25; F01D 25/285; F16B 2001/0035; F05D 2230/64; F05D 2250/30; F05D 2270/804; F05D 2270/821
See application file for complete search history.

(56) References Cited

U.S. PATENT DOCUMENTS 4,518,855 A   5/1985 Malak
4,553,335 A   11/1985 Woyton
(Continued)

FOREIGN PATENT DOCUMENTS

CN   204007548 U   12/2014
CN   105841674 A   8/2016
(Continued)

OTHER PUBLICATIONS

PCT/IB2019/058932 ISA/201 and ISA/237 Search Report and Written Opinion dated Feb. 7, 2020.
(Continued)

*Primary Examiner* — Yaritza Guadalupe-McCall
(74) *Attorney, Agent, or Firm* — David E. Boundy; Potomac Law Group, PLLC

(57) ABSTRACT

For alignment of rotational shafts, two devices for attachment to circular faces of two shaft segments. Each of the two devices has a laser photoelectric device for ascertaining a dimension of displacement of the two shafts from a desired axis of rotation relative to each other. Each of the two devices having a base surface with two linear contact edges designed to engage with a circumferential surface of a shaft and to ensure alignment between the device and an axis of rotation of the shaft to within a tolerance compatible with alignment tolerances of the shaft. Each of the two linear contact edges includes at least two terminal end regions and a center region together defining a line contact at linear intersection of two surfaces meeting at a non-zero angle linear contact edges designed to affix and release from the shaft surface, and to ensure parallel alignment between the device and an axis of rotation of the shaft to a precision allowing measurements to within tolerances required by machinery driven by the shaft. The base surface of at least one of the devices has been modified from its commercially- (Continued)

delivered condition to provide raised rails designed to improve tactile feedback of to a user of the alignment between the base and an axis of rotation of the shaft, and has affixed thereto two rails designed to improve tactile feedback of to a user of the alignment between the base and an axis of rotation of the shaft. Each base has a magnet and a switch to vary magnetic flux for affixation and release from the shaft surface. Each device has brackets designed to securely and reproducibly position laser photoelectric devices relative to the base and axis of rotation of the shaft. The attaching includes a human placing at least one of the devices slightly askew relative to the axis of rotation of the shaft, and the human gently twisting the device to allow the liner contact edges to seat on the circumferential surface of the shaft, to provide tactile feedback to the human to confirm parallel alignment between the at least one device's laser photoelectronic device and the axis of rotation of the shaft.

16 Claims, 17 Drawing Sheets

Related U.S. Application Data

(60) Provisional application No. 62/748,464, filed on Oct. 21, 2018.

(51) Int. Cl.
*F01D 25/28* (2006.01)
*F16B 1/00* (2006.01)

(56) References Cited

U.S. PATENT DOCUMENTS

| | | | |
|---|---|---|---|
| 4,709,485 | A | 12/1987 | Bowman |
| 5,077,905 | A | 1/1992 | Murray |
| 5,684,578 | A | 11/1997 | Nower |
| 5,715,609 | A | 2/1998 | Nower |
| 6,046,799 | A | 4/2000 | Lysen |
| 6,098,297 | A | 8/2000 | Belfiore |
| 6,411,375 | B1 | 6/2002 | Hinkle |
| 6,784,986 | B2 | 8/2004 | Lysen |
| 6,792,688 | B2 | 9/2004 | Busch |
| 6,873,931 | B1 | 3/2005 | Nower |
| 6,915,582 | B1 | 7/2005 | Engels |
| 6,968,625 | B2 | 11/2005 | Segerstrom |
| 7,174,649 | B1 | 2/2007 | Harris |
| 7,301,616 | B2 | 11/2007 | Foley |
| 8,209,875 | B1 | 7/2012 | Harris |
| 8,689,455 | B2 | 4/2014 | Smith |
| 8,955,230 | B2 | 2/2015 | Alexander |
| 8,997,365 | B2 | 4/2015 | Alexander |
| 9,080,862 | B2 | 7/2015 | Weihrauch |
| 9,366,527 | B2 | 6/2016 | Weihrauch |
| 9,605,951 | B2 | 3/2017 | Hblzl |
| 9,964,394 | B2 | 5/2018 | Andersson |
| 11,193,760 | B2 * | 12/2021 | Strunk ................ G01B 11/272 |
| 11,200,404 | B2 | 12/2021 | Zhao et al. |
| 11,300,404 | B2 * | 4/2022 | Jozokos .................. G01B 5/25 |
| 2011/0176145 | A1 | 7/2011 | Edmonds |
| 2013/0269194 | A1 * | 10/2013 | Sansom ............... G01B 11/272 33/286 |
| 2015/0042986 | A1 | 2/2015 | Weihrauch |
| 2016/0003608 | A1 | 1/2016 | Lenz |
| 2016/0223320 | A1 | 8/2016 | Hblzl |
| 2016/0363432 | A1 | 12/2016 | Andersson |
| 2017/0232605 | A1 | 8/2017 | Morton |
| 2020/0124409 | A1 | 4/2020 | Jozokos |
| 2022/0268575 | A1 * | 8/2022 | Jozokos ................ F01D 25/285 |

FOREIGN PATENT DOCUMENTS

| | | |
|---|---|---|
| CN | 108204792 A | 6/2018 |
| CN | 108458673 | 8/2018 |
| JP | 6-147826 | 5/1994 |
| JP | 2013-517482 | 5/2013 |
| KR | 20-2008-0004566 U | 10/2008 |
| KR | 2020070005773 U | 10/2008 |
| RU | 2352901 C2 | 4/2009 |
| WO | WO2014/092523 A1 | 6/2014 |

OTHER PUBLICATIONS

PCT/IB2019/058932 China Peer Search Report dated Jan. 7, 2020.
PCT/IB2019/058932 EPO Peer Search Report dated Jan. 10, 2020.
PCT/IB2019/058932 JP Peer Search Report dated Jan. 9, 2020.
PCT/IB2019/058932 US Peer Search Report dated Jan. 9, 2020.
Prüftechnik Condition Monitoring GmbH, Prüftechnik White Paper: Precision Meets Connectivity (Sep. 2015).
Prüftechnik Condition Monitoring GmbH, Rotalign touch, Precision Meets Connectivity, DOC 50.400.EN (2015).

* cited by examiner

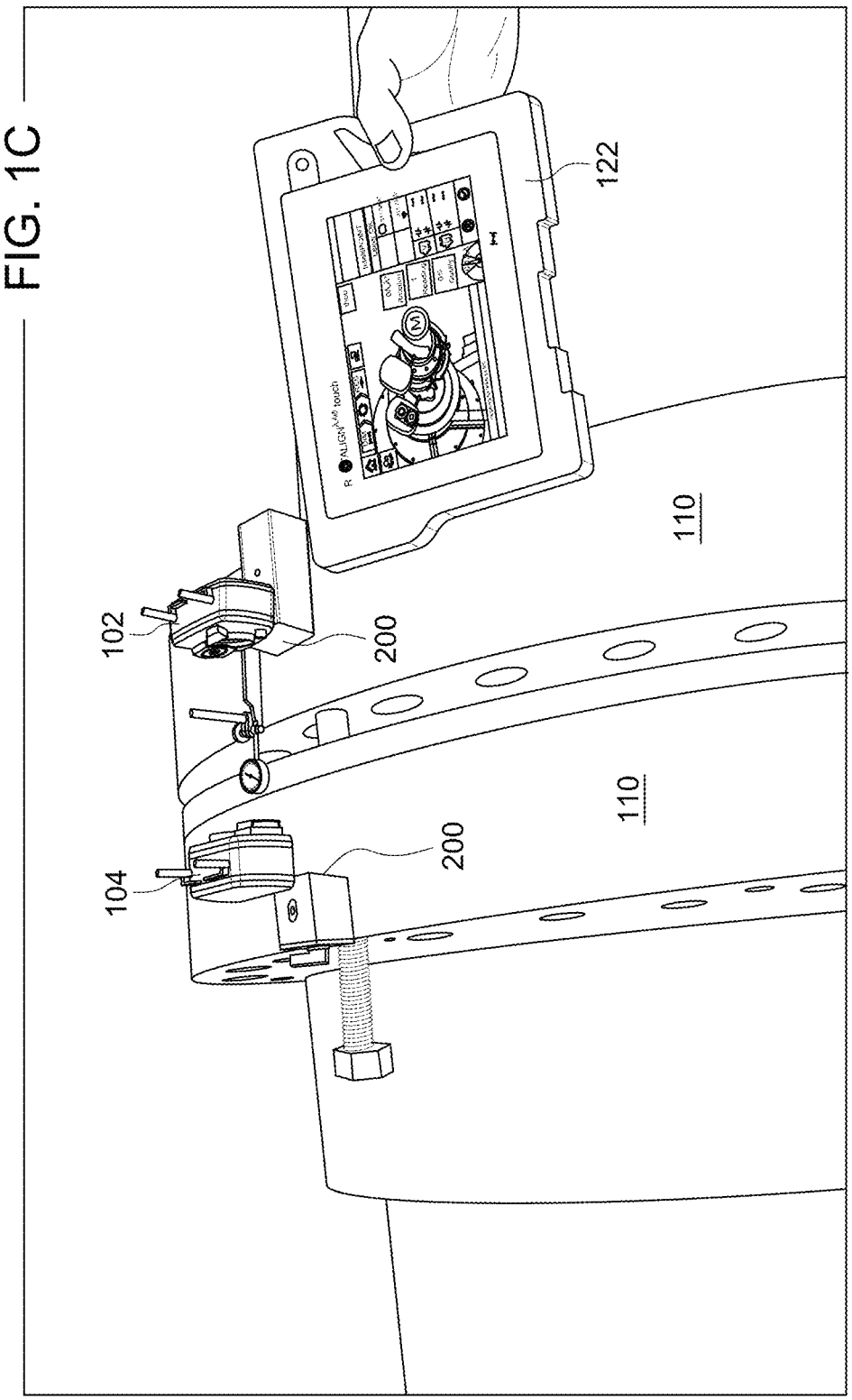

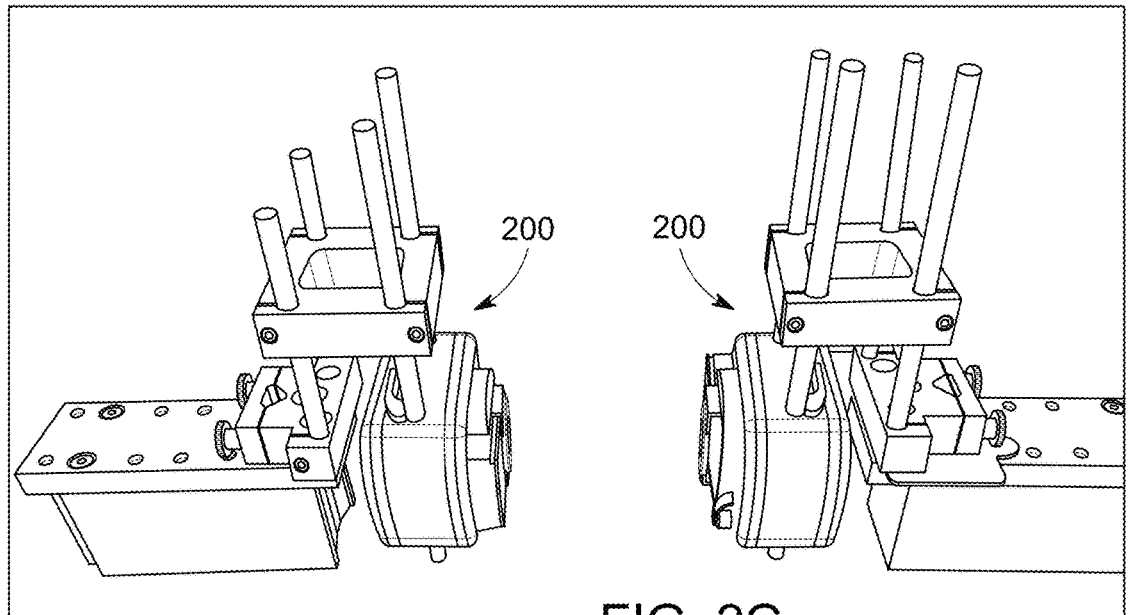
FIG. 2C
FIG. 2D
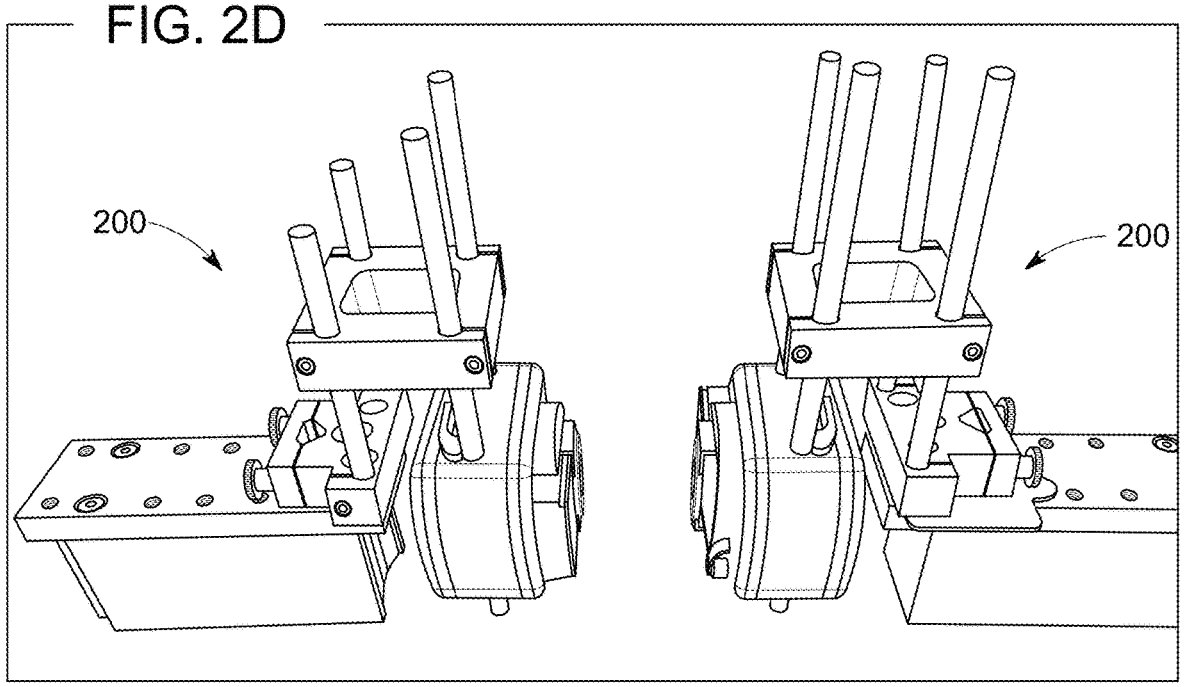

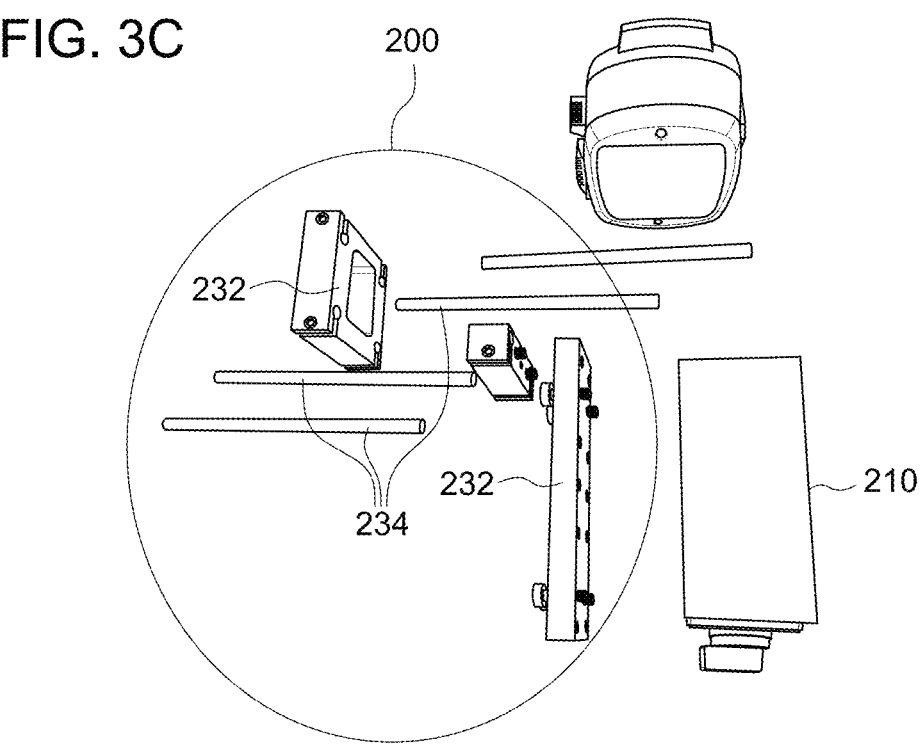

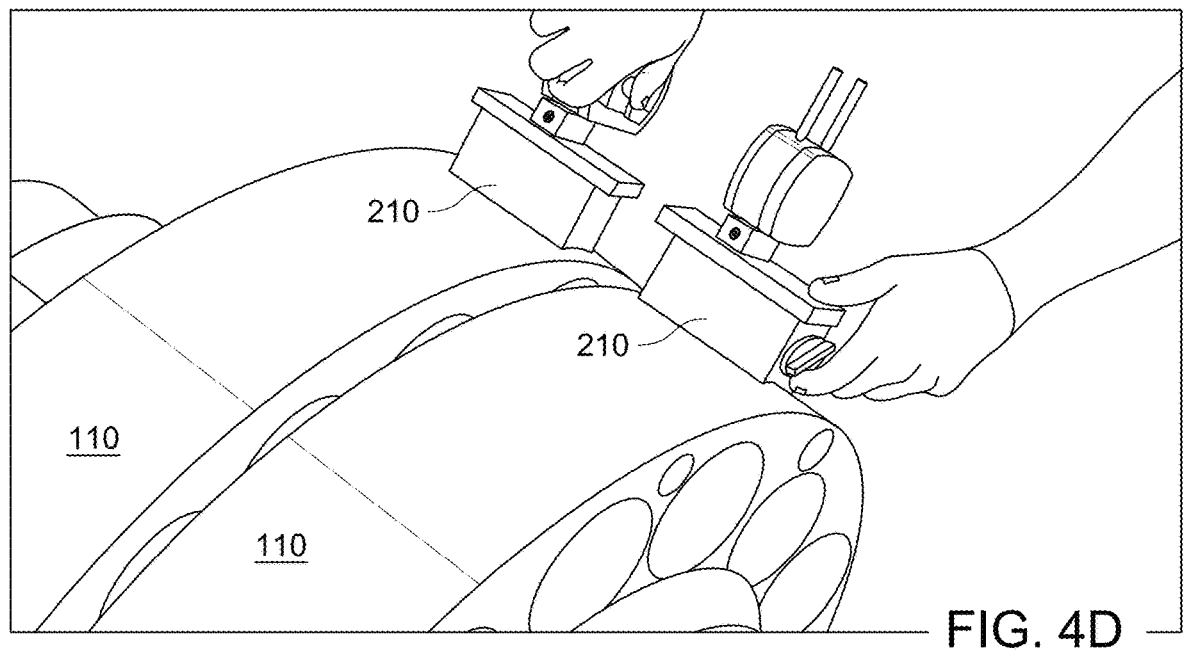
FIG. 4D
FIG. 4E
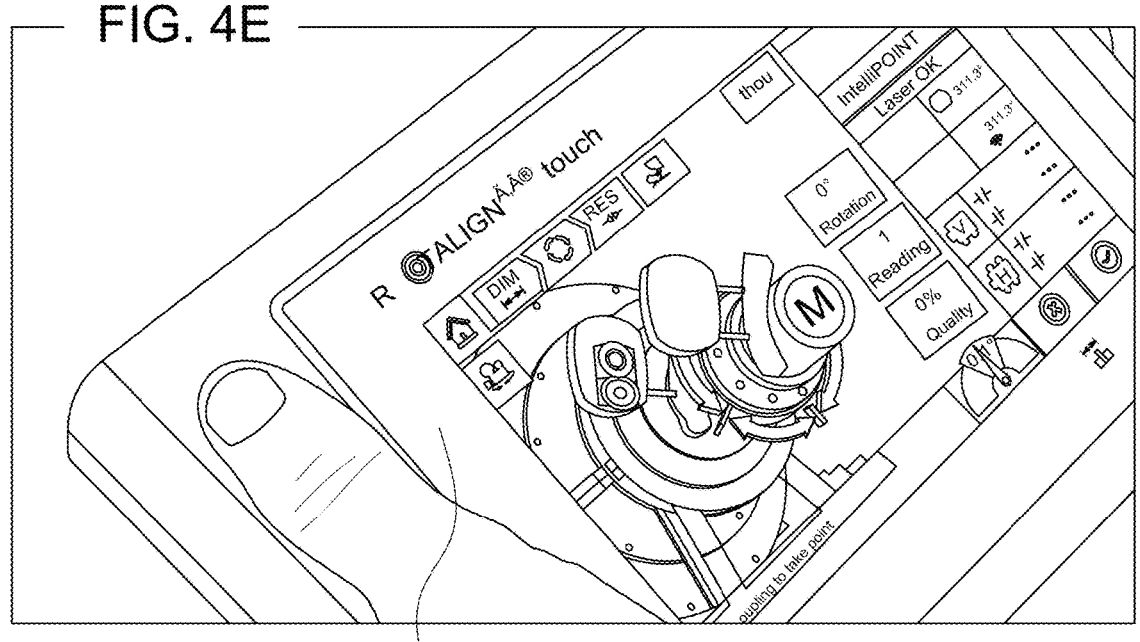

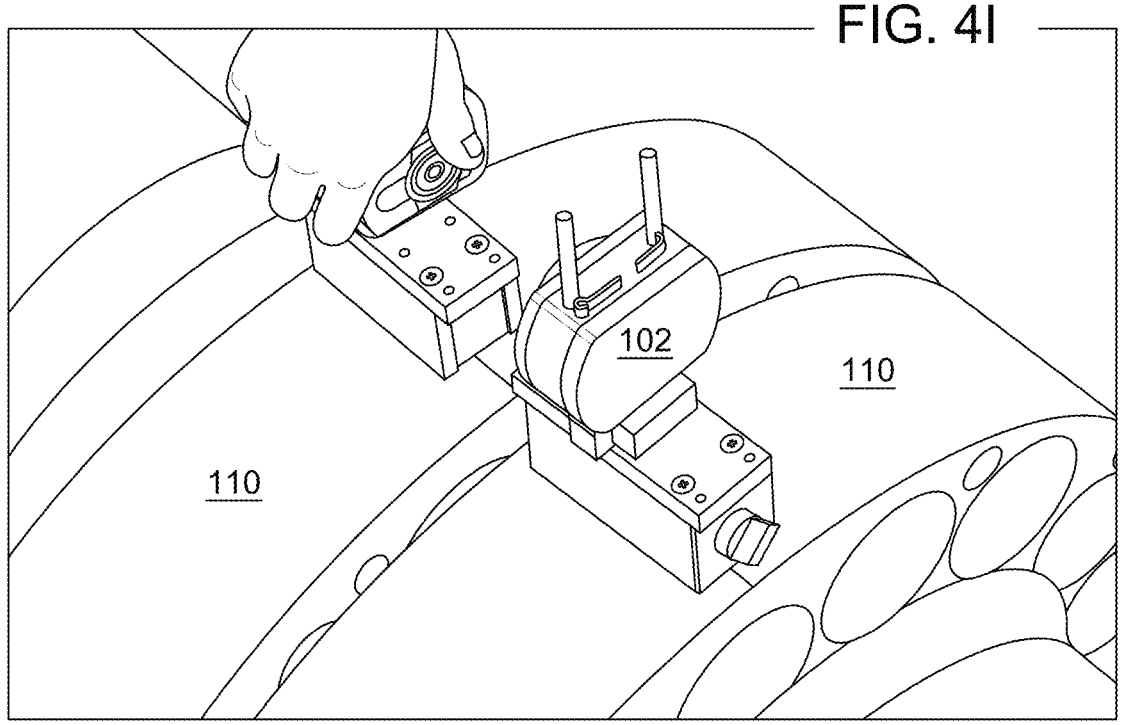

ALIGNMENT OF ROTATIONAL SHAFTS

This application is a continuation of U.S. application Ser. No. 16/658,072, filed Oct. 19, 2019, Alignment of Rotational Shafts, now issued as U.S. Pat. No. 11,300,404; which is a non-provisional of U.S. Provisional App. Ser. No. 62/748,464, filed Oct. 21, 2018. The '072 and '464 applications are incorporated by reference.

BACKGROUND

This application relates to measurement and testing of alignment or angles of rotational axes of rotational shafts using photoelectric detection means.

When machinery with machine shafts is disassembled for maintenance, during reassembly, various shaft sections must be realigned to high precision.

The traditional method of measuring shaft alignment is to glue a dial indicator or one or more photodetectors onto a shaft coupling face or onto a fixed location on the circumference of the shaft. Various measurements are taken of the two shaft segments with respect to each other. The dial indicator is used to measure the radial distance between the couplings. Then gauge blocks are used to measure the gap at 0°, 90°, 180°, and 270°. Then oil lift pumps are turned on to allow the shaft to be rotated by 90°. Then the lift oil pumps are shut off to allow the shaft segments to settle into their journal bearings. Then, the dial indicator and four gauge block measurements are repeated at 90°. The dial indicator measurement is used as a control to account for change in the gauge block measurements between rotational locations. Then the shafts are rotated twice more, to 180° and 270°, and the measurements repeated. Thus, sixteen gauge block measurements are taken, four dial indicator measurements are taken, and the lift oil pumps are used four times. A fifth rotation is required to get to a full 360° rotation, to verify the measurement against the original dial indicator measurement at 0°.

From those measurements, linear displacements and angular offsets are computed, then position and/or angle of one or both of the shaft sections are adjusted, and the measurements are repeated until the shaft segments are aligned to within the necessary tolerance.

SUMMARY

In general, in a first aspect, the invention features an apparatus for measuring alignment of two shafts. Two magnetic bases each have two linear contact edges designed to engage with a circumferential surface of a shaft at least 10 inches in diameter and to ensure alignment between the base and an axis of rotation of the shaft to within a tolerance compatible with alignment tolerances of the shaft. Each base has a switch to vary magnetic flux for affixation and release from the shaft surface. Brackets attached to the bases are designed to attach laser photoelectric devices, the photoelectric devices designed to measure shaft misalignment.

In general, in a second aspect, the invention features a method. To circular faces of two shaft segments each at least 10 inches in diameter, two devices are attached. Each device has a base surface designed to engage with a circumferential surface of a shaft at least 10 inches in diameter, and each base surface having features designed to affix and release from the shaft surface, and to align with the rotational axis of the shaft to a precision allowing measurements to within tolerances required by machinery driven by the shaft. Each of the two devices has laser photoelectric devices for ascertaining a dimension of displacement of the two shafts from a desired axis of rotation relative to each other. The attaching including moving the devices to allow the linear contact edges to bite the circumferential surfaces of the shaft segments to assure parallel mounting. The bases and brackets are used to take multiple measurements by the laser photoelectric devices, rather than by rotation of the shaft. (Rotation of the shafts is not altogether precluded; rather, the base and photoelectric devices reduce the need for rotations between measurements, perhaps to zero.)

Embodiments of the invention may include one or more of the following. The laser photoelectric devices may be a one-laser system or a two-laser system. The brackets may be adaptable to allow the measurements to be taken through bolt holes of shaft couplings. The brackets may be designed to allow the laser photoelectric devices to face each other. The bases may be magnetic, with on/off switches to apply or withdraw magnetic flux for affixation or release of the base from the shaft. A bottom surface of at least one of the two bases may be modified from its commercially-delivered condition to provide raised rails designed to improve tactile feedback of to a user of the alignment between the base and an axis of rotation of the shaft. At least one of the two bases may have affixed thereto two rails designed to improve tactile feedback of to a user of the alignment between the base and an axis of rotation of the shaft.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION OF THE DRAWINGS

FIGS. 1(a) to 1(c) are photographs showing a time sequence of use of a device to measure shaft alignment.

FIGS. 2(a) to 2(d) are photographs of a device to measure shaft alignment, and component parts of the device.

FIGS. 3(a) to 3(m) are photographs of a device to measure shaft alignment, and component parts of the device.

FIGS. 4(a) to 4(i) are photographs showing a time sequence of use of a device to measure shaft alignment.

DESCRIPTION

Figure 1A:
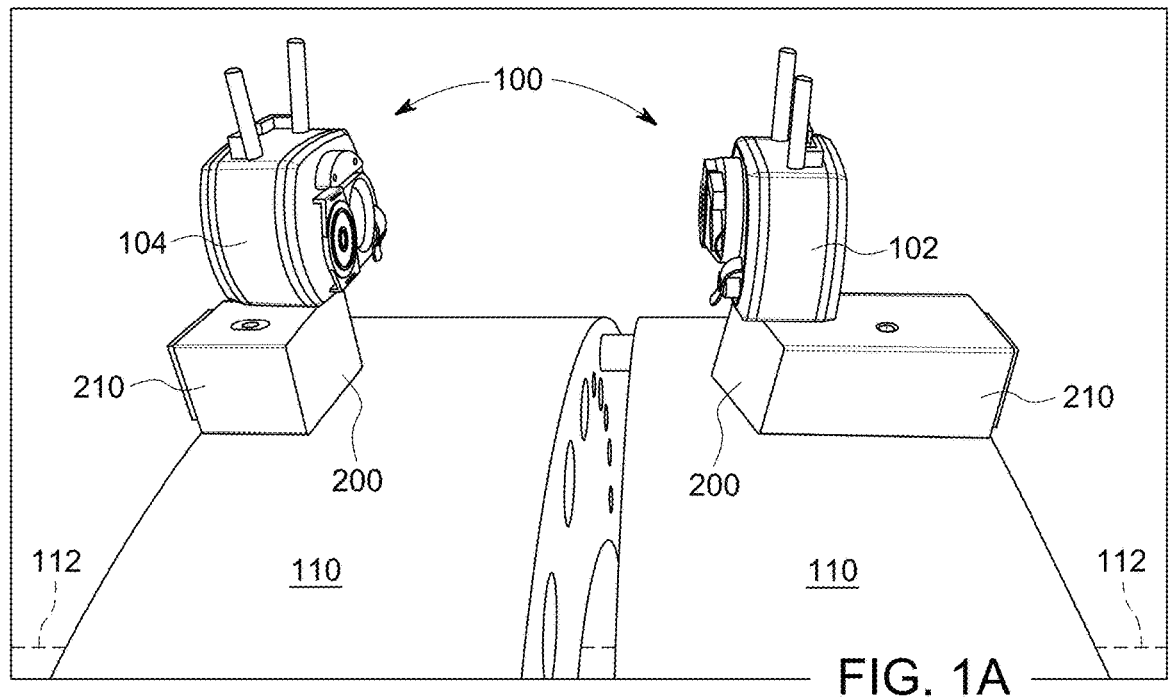

The Description is organized as follows.
I. Overview
II. Alternative configuration
III. Components
IV. An operational use case
I. Overview Referring to FIGS. 1A to 1C, laser alignment system 100 may be positioned on two segments 110 of a rotating shaft to measure alignment of the rotational centerlines 112 of the two shaft segments. Alignment may have four parameters: linear offset or displacement (horizontal and vertical), and angular parallelism in two dimensions. Once alignment is measured, the shafts may be adjusted to ensure that the two rotational centerlines 112 are aligned to within desired tolerances. Laser alignment system 100 may have a laser unit 102 and sensor unit 104, or may be a two laser/sensor system. A device of bases 210 and photodetectors may be configured to reproducibly position laser unit 102 and sensor unit 104 relative to each other on the two shafts 110, so that sufficient measurements may be taken to align the two segments of the shaft. For example, in power plants where the turbine rotors or shafts are very large and/or hard to rotate, the device may allow obtaining reproducible, accurate, and precise measurements by moving the laser and sensor from place to place, reducing need to rotate the shafts for measurement.

Figure 1B:
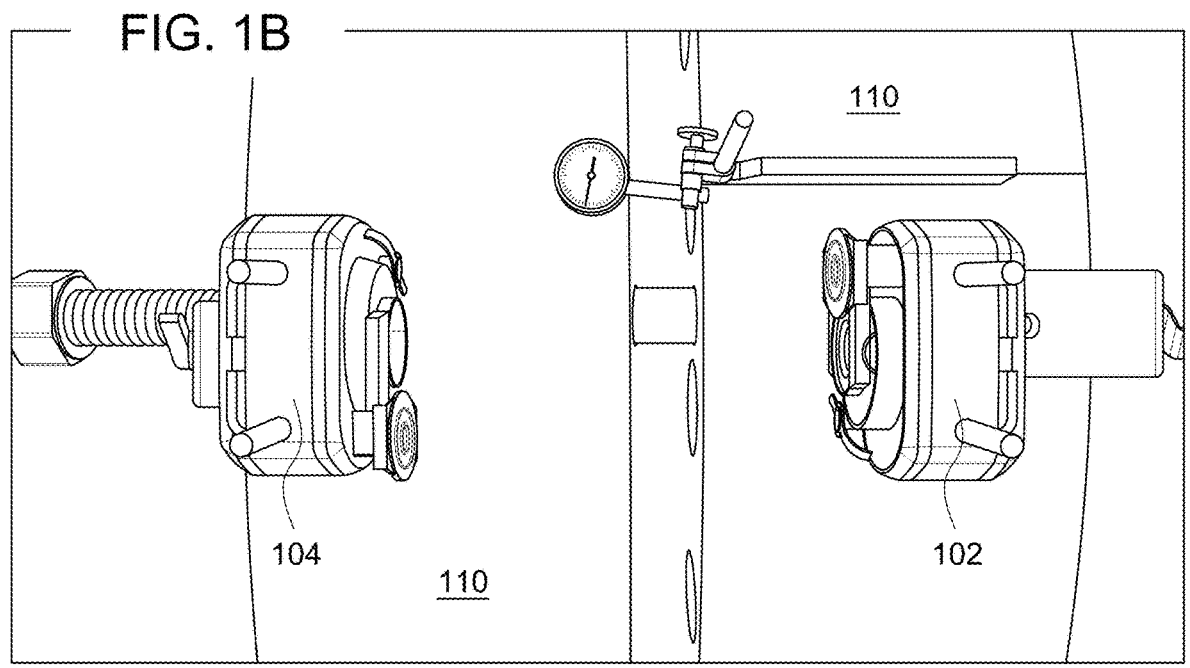
Figure 2A:
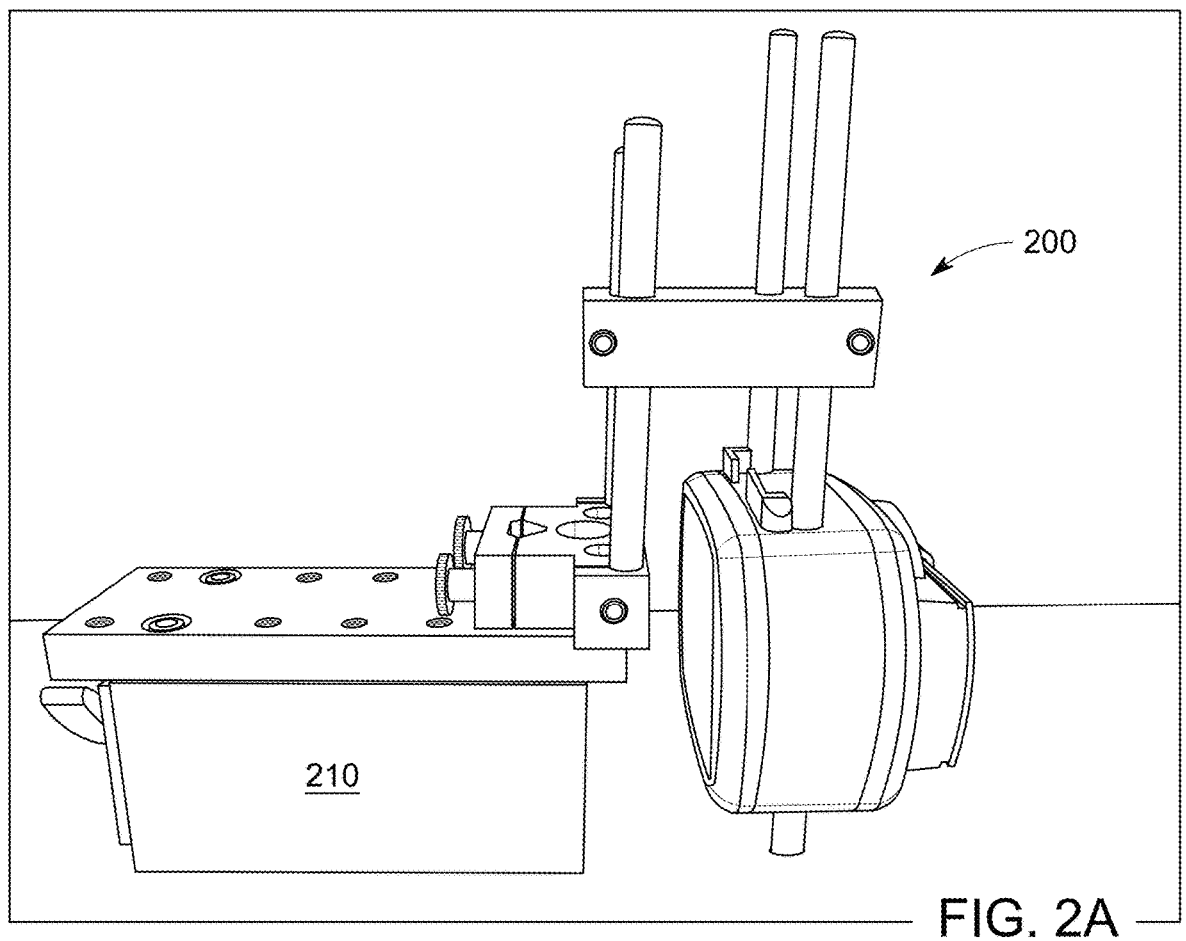
Figure 2B:
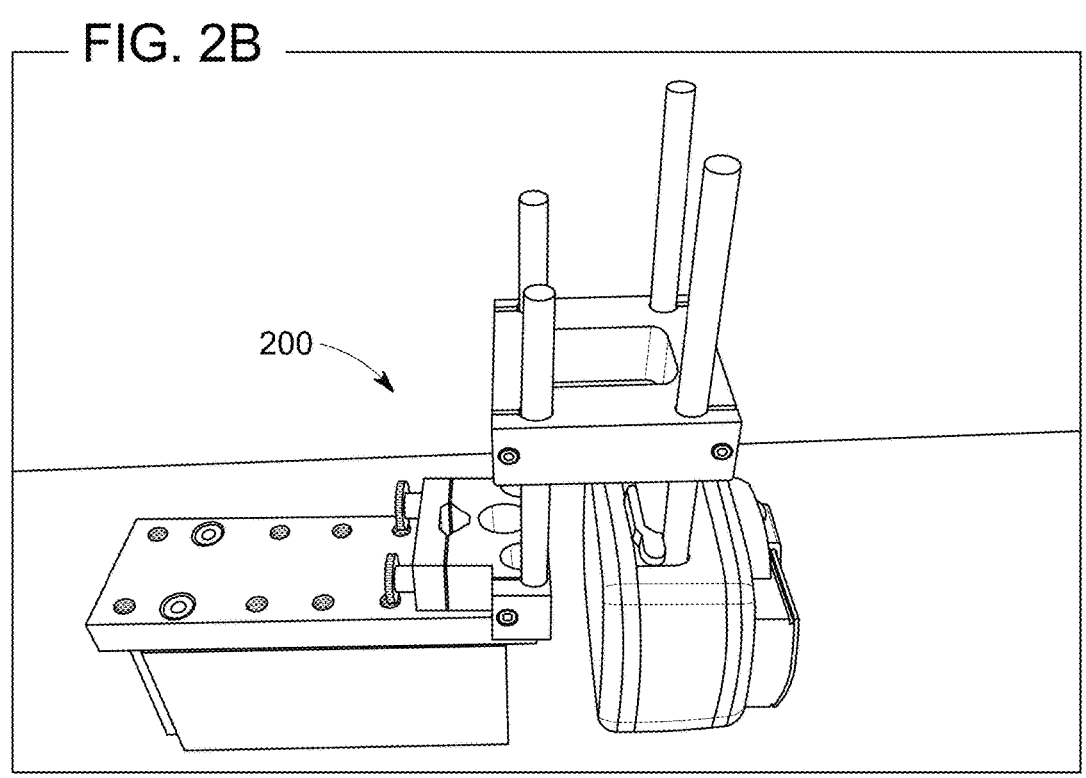

In FIG. 1B, on the right shaft coupling, zero degrees is marked at the point where a bar is glued to hold a dial indicator 118. The bar and dial indicator 118 are used in the traditional testing method, to ensure that use of the laser device 100, 102, 104 gives readings consistent with the traditional measurement technique.

In the example of FIGS. 1A to 1C, the coupling for two segments 110 of a power plant steam turbine shaft may be 50 inches (127 cm) or more in diameter. The turbine manufacturer's specifications may require that the two segments be aligned to some tolerance, typically for horizontal/vertical linear alignment, 0.002" to 0.004" (50 to 100 μm), and for angular alignment, to within 0.002" to 0.004" in difference in gap across the diameter of the coupling (that is, an angle that is within arc sin(0.004/50) of perfectly parallel, that is, about 0.0045° or about 16 arcseconds.

Referring to FIGS. 1A and 1B, brackets 200 may be designed to position laser unit 102 and sensor unit 104 on the outer circumference of two shafts or coupling segments. Brackets 200 may be designed so that laser unit 102 and sensor unit 104, or a two laser/sensor system, may be reliably aligned parallel with the axis 112 of the shaft.

In some cases, measuring optical photoelectronic devices such those from Prüftechnik of Germany, including Prüftechnik's Rotalign Touch system or Rotalign Ultra system may be used (the two web pages https://www.pruftechnik.com/us/products/alignment-systems-for-rotating-machinery/shaft-alignment-systems/rotalign-touch.html and https://www.pruftechnik.com/us/products/alignment-systems-for-rotating-machinery/shaft-alignment-systems/rotalign-ultra-is.html as of the filing date, and ROTALIGN touch brochure, ROTALIGN touch Whitepaper, and ROTALIGN Ultra iS brochure are incorporated by reference). Among other alternatives are laser shaft alignment systems made by FixturLaser of Sweden, or Easy-Laser of Sweden, both of which are two-laser systems, or the Stealth Series from Hamar Geolasers of Danbury, Conn.

In the single-laser system shown in FIGS. 1A and 1B, laser unit 104 is on the right. Sensor unit 104 that receives the laser beam from laser unit 102 is on the left. Laser unit 102 allows the laser beam to be adjusted for up/down and left/right aim. Sensor unit 104 detects the x y location and angle of incidence of the incoming laser beam, so long as the laser beam enters within a 2° tolerance window (1° in each direction off center). Optics internal to sensor unit 104 create a first detector plane near the front surface of sensor unit 104, and a second virtual detector plane behind the first detector plane by about 12 inches, so the combination of x y readings from the two image planes allows precise measurement of the angle of incidence. In addition, laser unit 102 and sensor unit 104 have inclinometers so each can detect its own rotational angular orientation. Other systems such as a 2 laser/sensor system comprise of two laser/sensor combination units used in a similar fashion.

Referring to FIG. 1C, to calculate misalignment, multiple measurements taken by laser unit 102 and sensor unit 104 may be taken and combined to ascertain linear and angular alignment. To take these measurements, sensor unit 104 and laser unit are moved from position to position around the circumference of two corresponding smooth circular surfaces 110 of the two shafts, to collect multiple measurements for the calculation. At each position, the base 210 provides sufficient precision in the coupling of the device to the shaft or coupling so that measurements can be taken that are meaningful with respect to the tolerances. For example, if the shafts must be aligned to within 16 arcseconds, the base-to-shaft alignment precision should be reproducible to within 4 arcseconds, 2 arcseconds, or 1 arcsecond depending on acceptable tolerances. In other applications, shaft alignment precision to within 8 arcseconds, 12 arcseconds, 16 arcseconds, 20 arcseconds, 30 arcseconds, or other measurements may be acceptable.

Measurement at three positions may be mathematically sufficient to measure alignment, if the apparatus is known to be perfect. Taking more measurement points may improve accuracy, provide redundancy for detection and correction of methodological error or misalignment within the apparatus, and reduce the number of trial-and-error alignment adjustments. Eight to fourteen measurement points may be desirable.

In FIG. 1C, laser unit 102 and sensor unit 104 are still on the top center of the couplings 110 for the two shaft sections, as they were in FIGS. 1A and 1B. A handheld computer 122 receives data from laser unit 102 and sensor unit 104 to, first, to confirm that the laser beam is hitting the sensor's detectors within the front window and within the 2°-wide angle permissible incidence. Once the laser and detector are lined up, then, second, a finger press of a "capture measurement point" button on the computer screen causes computer 122 to capture the following measurements:

The x and y linear position at which the laser beam hits each detector plane of sensor unit 104

The angle at which the laser beam hits the detector, based on differences between the forward and back image planes of the detector The angular orientations of laser unit 102 and of sensor unit 104. Because they will be progressed around the circumference of the circular shaft or coupling, the angular orientation of laser unit 102 and of sensor unit 104 translate into angular location on that circumference.

After each measurement is taken, laser unit 102 and sensor unit 104 are moved around the circumference of the shaft, and the process is repeated: laser unit 102 and sensor unit 104 are lined up, and then another finger press captures the next measurement point. Computer 122 may display the total number of measurement points taken, and the angle subtended by the measurements.

II. Alternative Configuration

FIGS. 2A, 2B, 2C, and 2D show a second configuration of brackets 200. In some cases, the outer circumference of the shaft coupling may have gear teeth or some other non-smooth or non-circular surface, which may limit ability to affix a measurement device. In those cases, laser unit 102 and sensor unit 104 may be mounted on the shaft, and the laser beam shot through the bolt holes of the two coupling (visible in FIGS. 4B and 4F).

In such cases, rods and blocks 200 may be arranged to hold laser unit 102 and sensor unit 104 in front of mounting base 210, down close to the shaft surface. Brackets 200 may provide a rigid and reproducible affixation of the laser and sensor unit 104 as low as touching the surface of the shaft. Magnetic base 210 shown (shown in grey in FIGS. 2A and 2B) is 55 mm in height, so it can be seen that the apertures of laser unit 102 and sensor unit 104 may be placed within 2 inches of the shaft surface.

The brackets may be designed to provide a range of heights so as to hold laser unit 102 and sensor unit 104 several inches above the surface to which base 210 is attached, to allow the laser and sensor to "see over" an obstruction.

III. Components

FIGS. 3A to 3I show the components of brackets 200, from the bottom up.

Figure 3A:
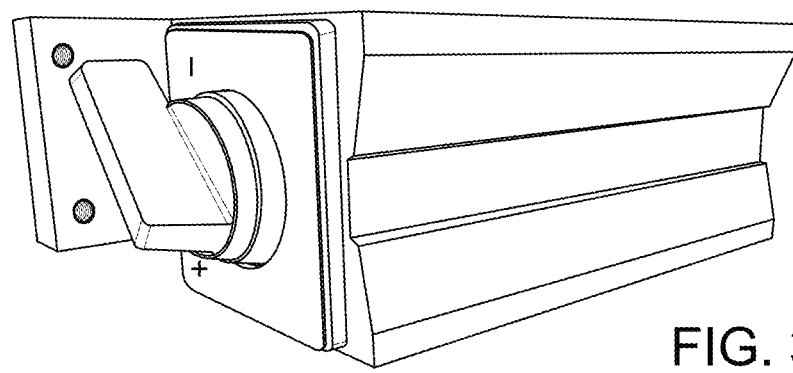

Referring to FIG. 3A, for attaching and detaching laser unit 102 and sensor unit 104, it may be desirable to use a base 210 of the type used with dial indicators. For example, the Noga On/Off Magnet base 210, model DG0039, is available from Noga Engineering & Technology of Israel, http://www.noga.com/Products/base/Bases/DG0039/On%7Cfs%7COff_magnet_-_DG0039 This model has a base 50 mm (2 inches) wide, and 120 mm (4.8 inches) long, with a V groove 220 in the bottom.

V-groove 220 provides two linear contacts against a curved machine surface. In other configurations, the bottom surface of base 210 may have two rails 242. As will be shown in FIGS. 4B, 4C, 4F, and 4G, the two linear contacts allow a person to feel the base "bite" as it seats with high precision to the curved surface of a large-diameter shaft. This provides reproducible seating parallel to the shaft axis 112.

Other similar bases 210 are available from Noga and other manufacturers. The appropriate base 210 for use with a given shaft may be chosen based on the configuration of the shaft. Generally, longer is better, to improve precision of alignment for parallelism, up to the width of whatever face the base 210 is to be attached to, and subject to a human's ability to manage the weight and length of the device. For larger-diameter shafts, bases 210 of wider width may be preferred. For smaller diameter shafts, bases 210 with narrower widths may be preferred. For non-ferrous shafts/couplings or large diameters, a wider V-block may be used, or magnetic base 210 may be replaced with a chain or strap fastener.

Magnetic base 210 has a magnet that can be switched on and off. The on position is labeled with a "+," and the off position is labeled with a "−," which can be seen in FIGS. 3A and 3H. When the magnet is turned off, the position of the bracket may be adjusted to high precision. Then when the magnet is turned on, the magnet holds the bracket securely with minimum risk of positional perturbation.

Figure 3B:
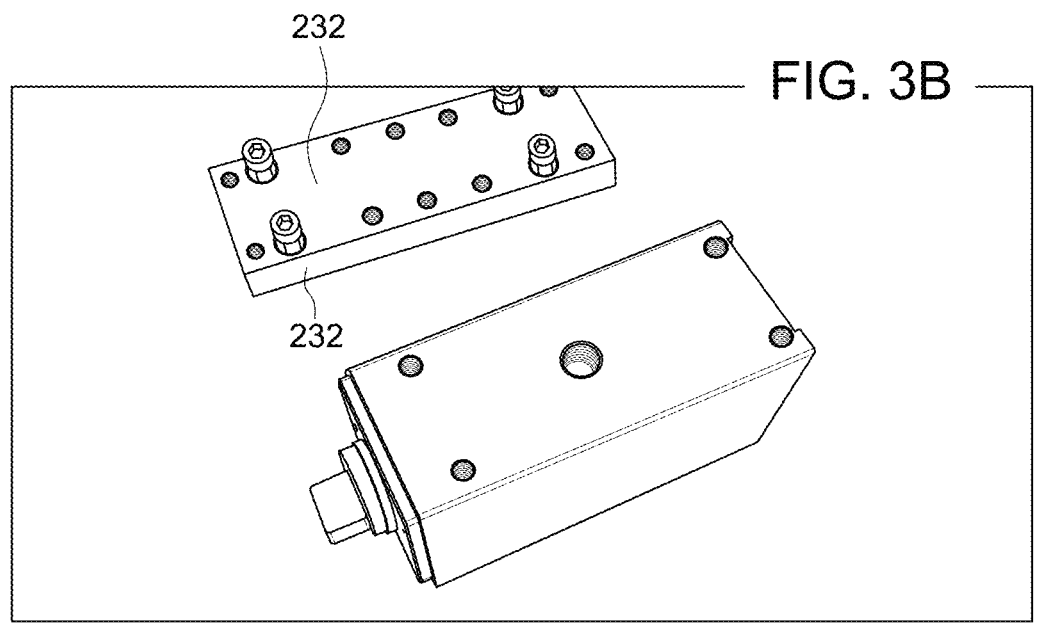

Referring to FIGS. 3B to 3(g), various components (blocks 232 and rods 234) may be configured to hold the Prüftechnik laser unit 102 and sensor unit 104, or other two-laser system, in a consistent orientation relative to magnetic base 210. In FIGS. 3B and 3C, a mounting block of aluminum is machined to be flat, and to provide several sets of mounting holes for rods. Any surface coating, etc. may be removed to ensure that the mounting block screws to magnetic base 210 with essentially no rocking or play (little enough to not erode the necessary tolerances). Holes may be drilled and tapped in base 210 and mounting block for fixing screws.

FIG. 3C shows components laid out for assembly. Magnetic base 210 is at the lower right. Mounting block 232 may be screwed to magnetic base 210 to affix the two together. Then comes a smaller rod holder block 232 that can be combined with the holes in the mounting block to hold two of the rods 234 and clamp them. This rod holder block 232 has screws to affix the rod holder block to the mounting block in any one of several different positions. Then come two rods 234 to be inserted through the rod holder block into one of the sets of holes in the mounting block. Two screws in the rod holder block may allow the rod holder block to be clamped down to hold the rods tight.

In some uses, the Prüftechnik laser unit and sensor unit 104 may be mounted on these two rods 234.

In other cases, where it is desired to hold laser unit 102 and sensor unit 104 closer to the surface of the shaft (like FIGS. 1B, 1C, and 1D) to shoot through bolt holes, a medium size block 232 mounts on the two rods, and in turn holds two more rods 234 that extend back down, where these two further rods may hold laser unit 102 or sensor unit 104. The medium block has screws that allow it to clamp the four rods it affixes.

The multiple sets of holes 236 in the mounting block 232 allows for mounting laser unit 102 and sensor unit 104 in different places relative to magnetic base 210. Using the center set of holes (as in FIGS. 3D, 3E, 3F, 3G, and 3I) tends to give a steadier, more reproducible mounting, because (as discussed above in connection with FIGS. 4C, 4F, and 4G), adjustment of laser unit 102 and sensor unit 104 to face each other tends to be a bit easier. Using a forward set of holes (as in FIGS. 2A through 2D) allows the device to be configured for the bolt hole configurations.

Figure 3D:
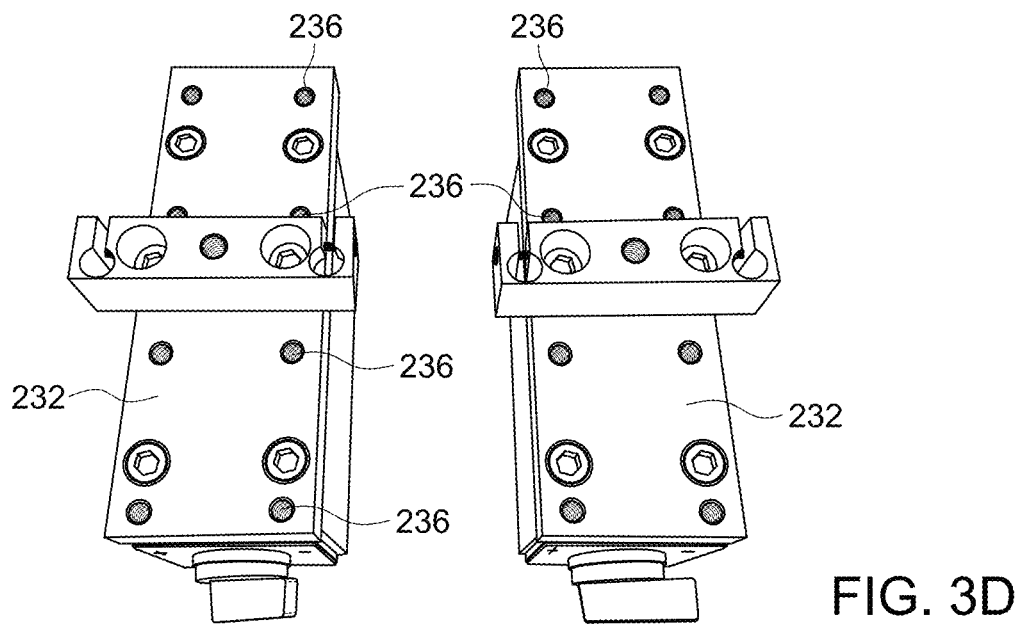
Figure 3E:
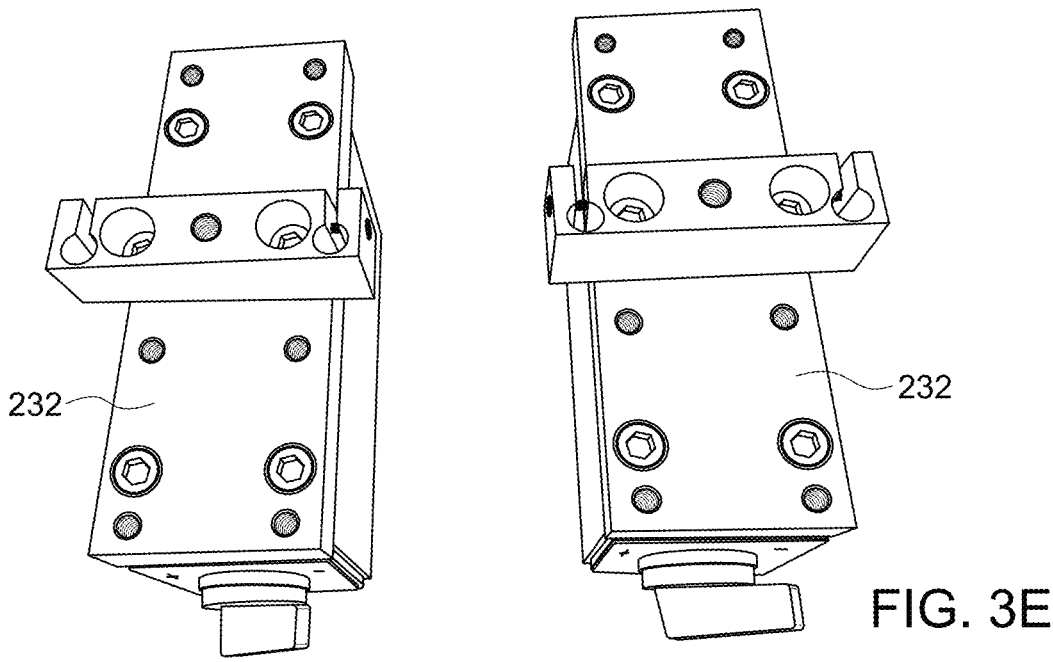

FIGS. 3D and 3E show the first mounting block 232 screwed onto magnetic base 210 and then the rod holder block in the center position of the mounting block.

Figure 3F:
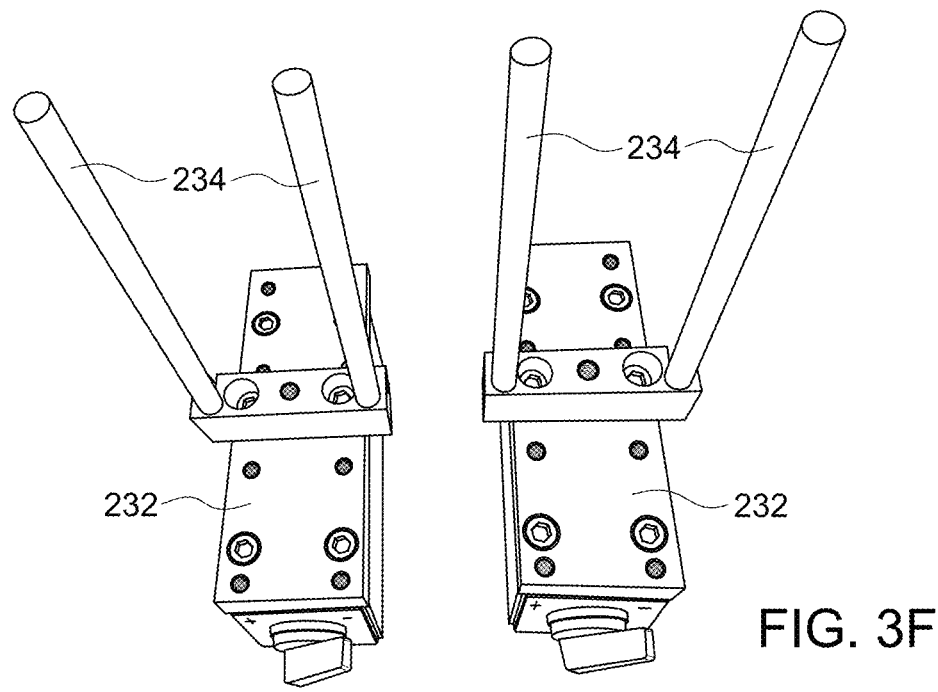

FIG. 3F shows two rods mounted into the rod holder block. The rods are held tight by clamping down on screws in the side of the rod holder block.

Figure 3G:
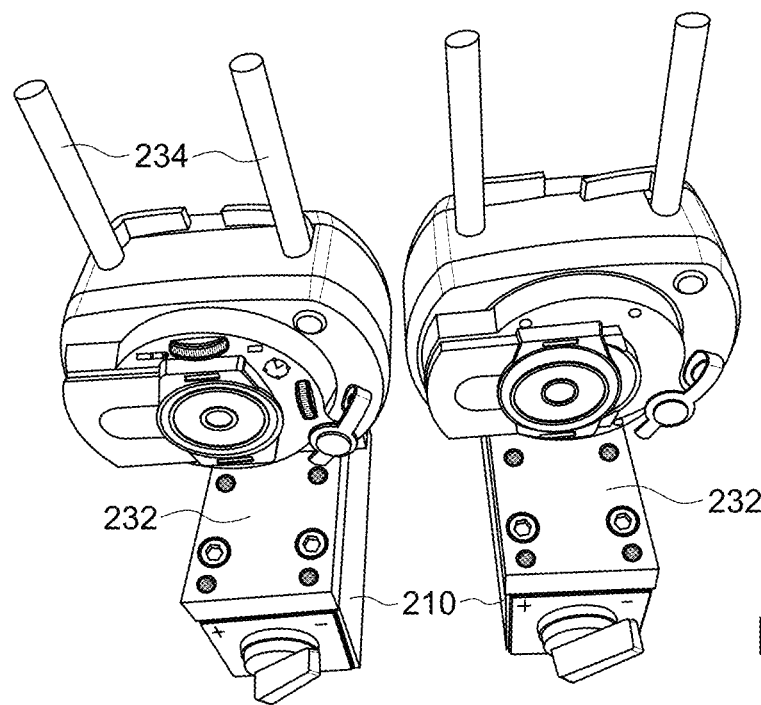
Figure 3H:
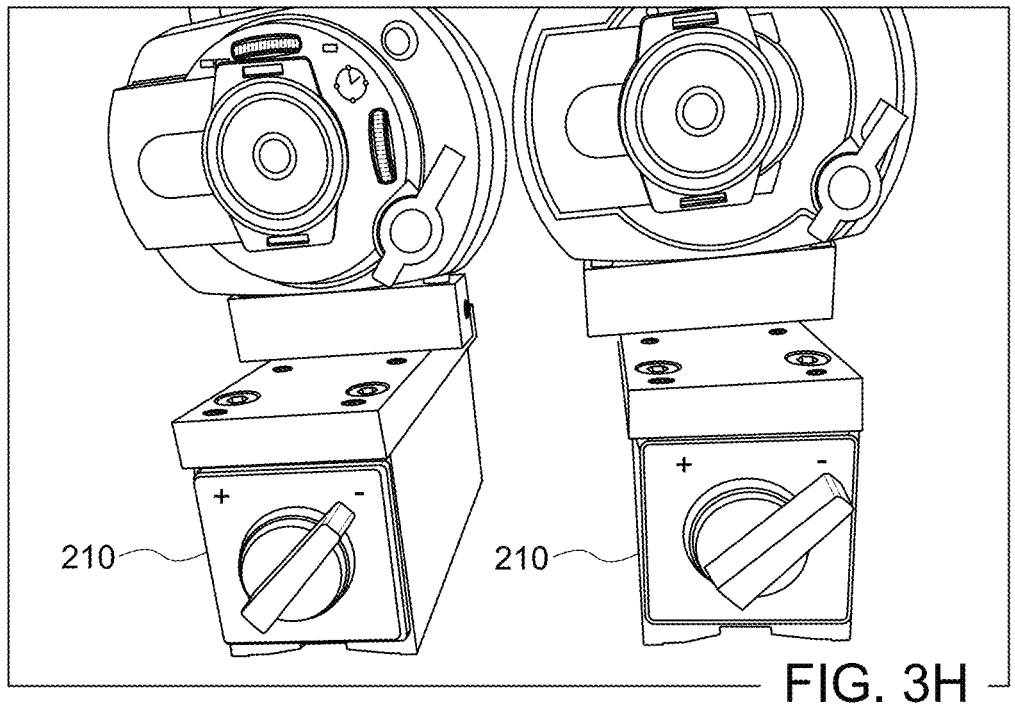
Figure 3I:
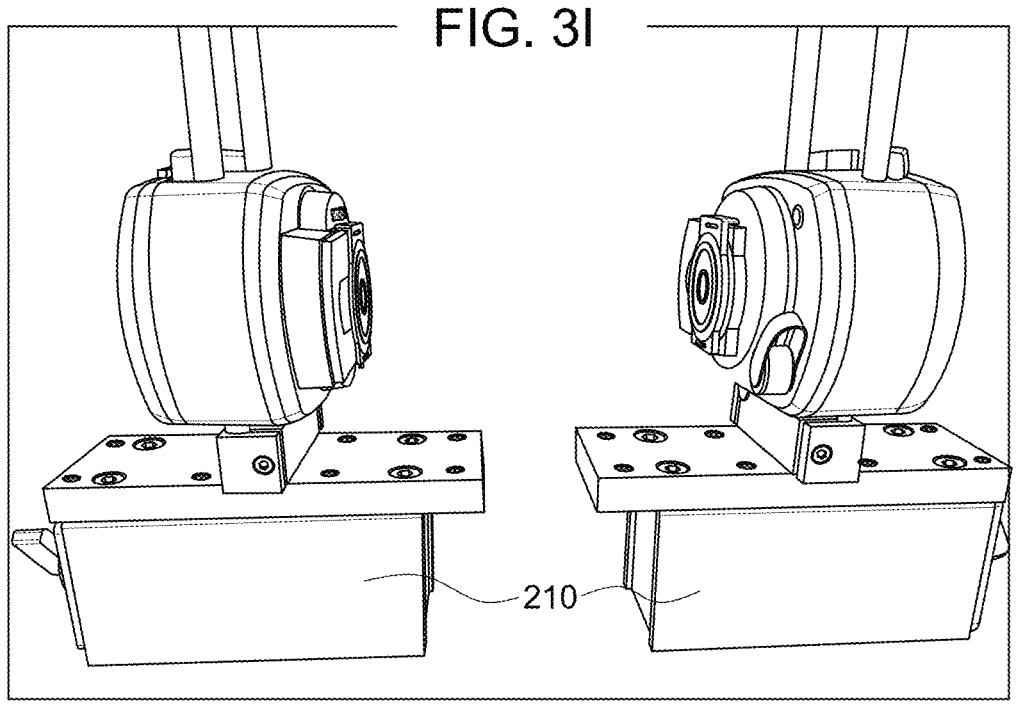

Referring to FIGS. 3G, 3H, and 3I, laser unit 102 and sensor may now be mounted onto these rods. After tightening all clamps to ensure rigid and stable mounting, the device is now ready to take readings.

Magnetic base 210 with linear or rail contact, as shown in FIGS. 3A and 3B, provides tactile feedback to a human who is to position the devices into measuring position. Other configurations may provide contact points with appropriate geometry—reasonably long in the dimension parallel to the shaft, up to the length of a smooth section of the shaft coupling, and at a width appropriate to the diameter of the shaft or coupling. Other mounting base devices, and configurations for contact points, may work as well. Especially with larger shaft diameters, in the range of 50 inches and more, long-contact solid parallel rails, or a V-groove 220, may give better tactile feedback.

Figure 3J:
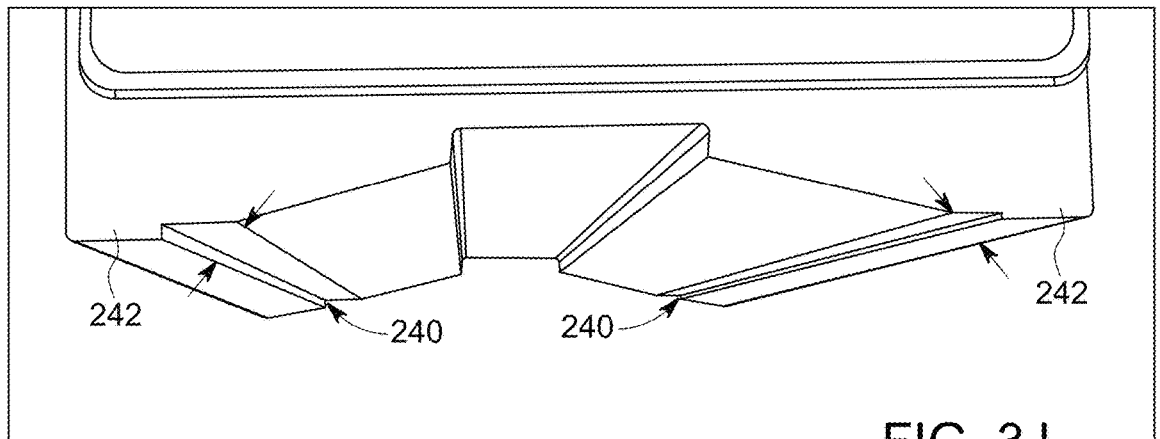
Figure 3K:
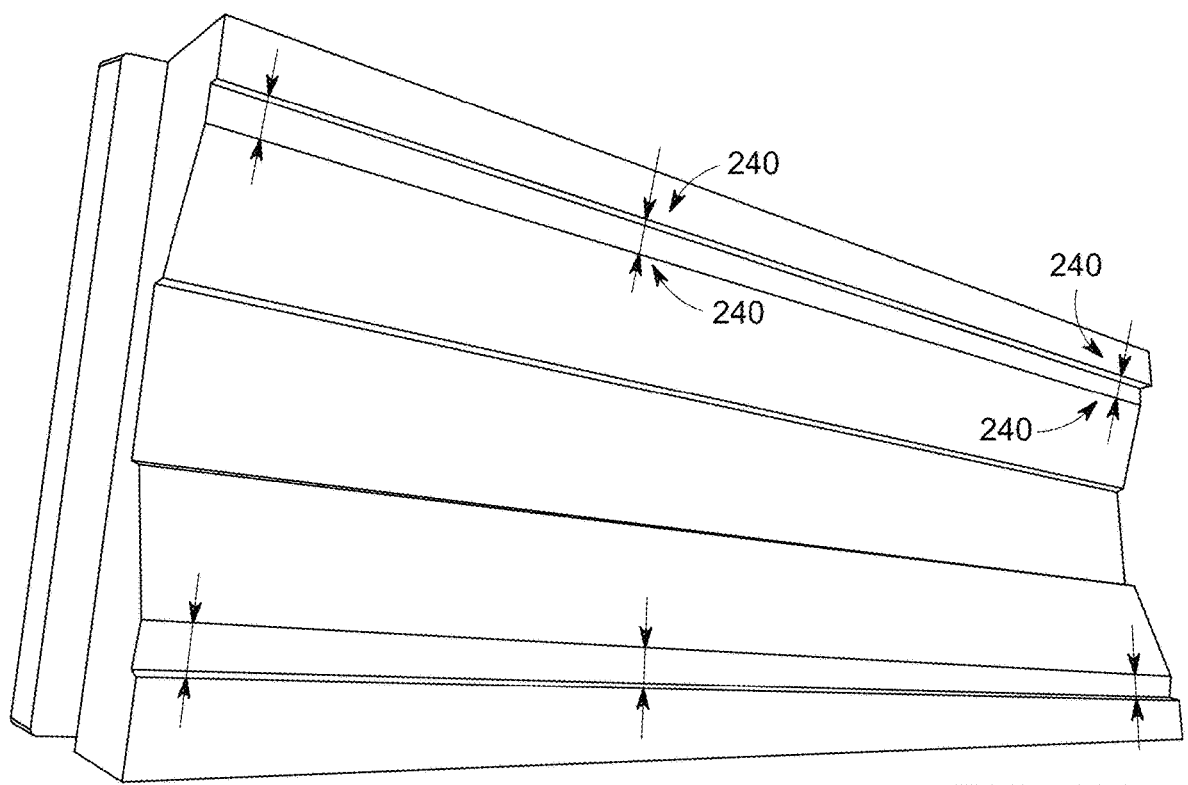

Referring to FIGS. 3J and 3K, a bottom surface of magnetic base 210 may have a pair of parallel grooves 240 milled in, leaving outer edge rails 242 in higher relief (compare the milled surface of FIGS. 3J and 3K with the "factory" condition of the bottom surface shown in FIG. 3A). The higher-relief rails 242 may provide greater "bite" into the shaft surface than the factory configuration of the base. Greater "bite" may in turn provide greater tactile feedback to the user when rails 242 and device become aligned parallel to axis of rotation 112.

Figure 3L:
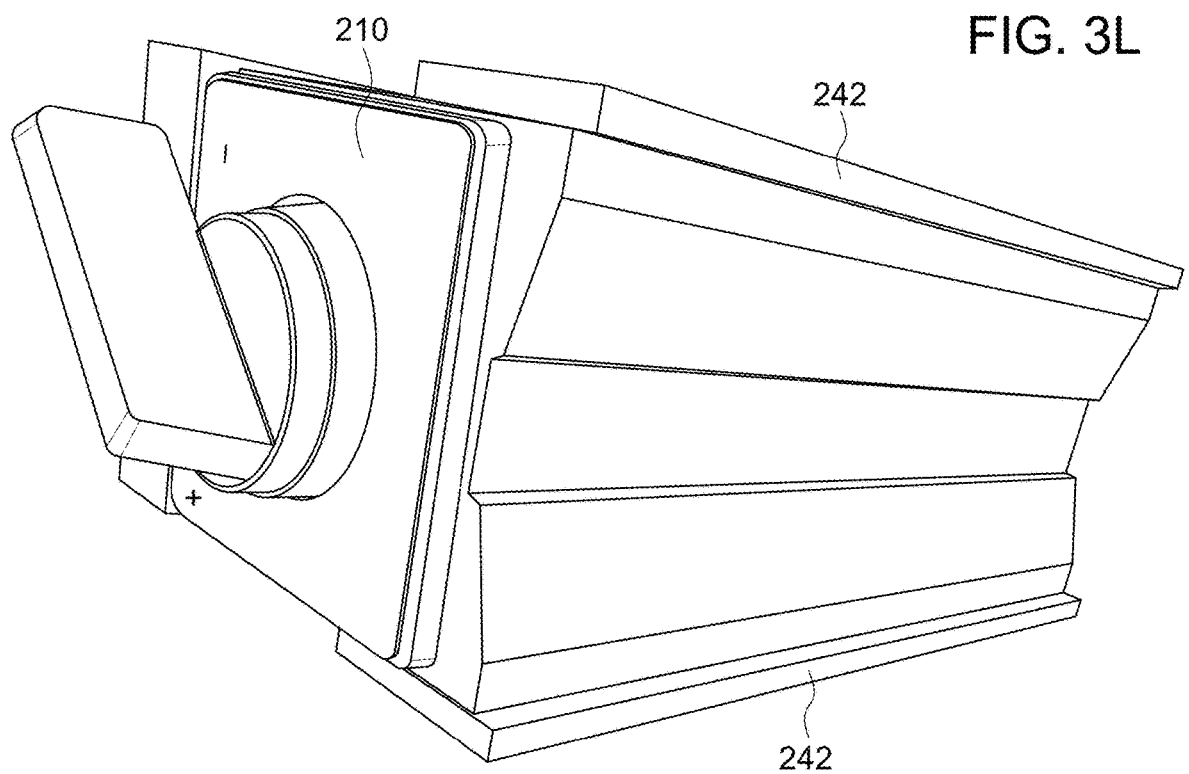
Figure 3M:
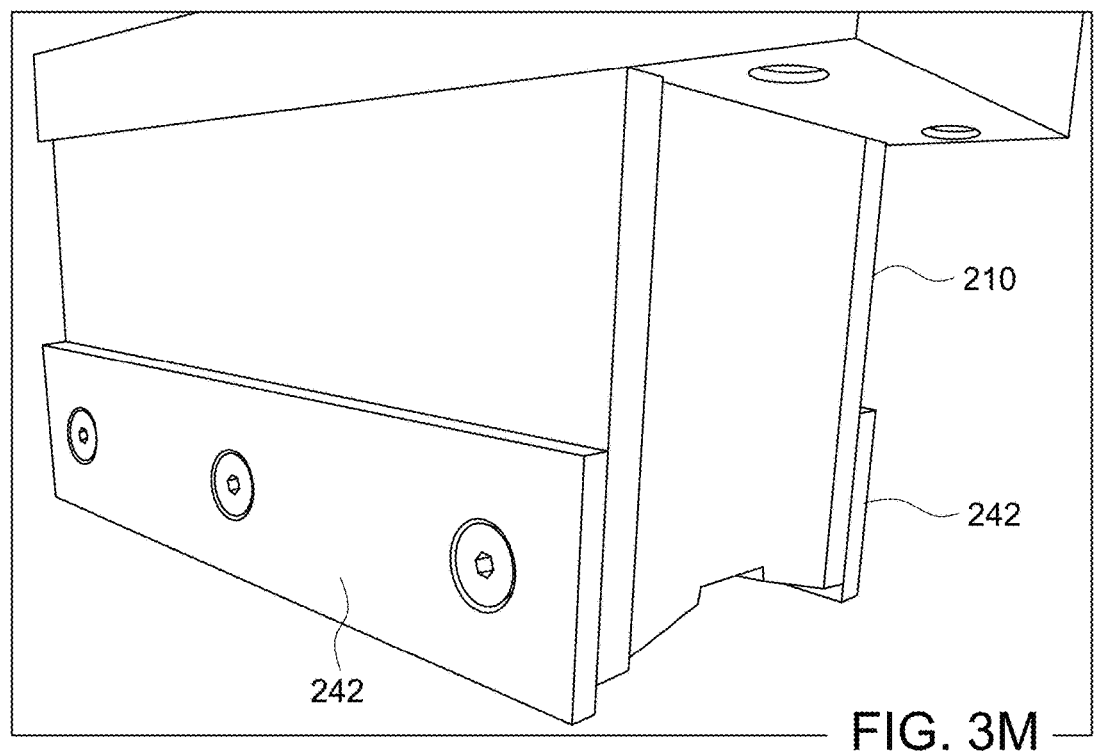

Referring to FIGS. 3L and 3M, external rails 242 may be affixed onto magnetic base 210. Externally-affixed rails 242 will somewhat increase the width between the bite rails, which tends to reduce alignment error. In some cases, external rails 242 could be longer than magnetic base 210, which again may reduce angular error. External rails 242 may be especially helpful in allowing a user feel the base "bite" as it comes into alignment with large diameter couplings (greater than 50 inches), and may also work well on smaller diameters. The wider design may also be helpful when an external surface of the shaft is rough, as there is less surface contact and the user can find areas of the coupling where there are smooth contact points. External rails 242 may preferably be made of a ferromagnetic metal (like iron or low-alloy steel) so that when magnetic base 210 is turned on, rails 242 become magnetic (as if they "conduct" magnetism) and become magnetically attractive to the surface of the shaft.

A rail spacing of about 50 mm (2 inches) or a little more, and length of about 120 mm (4.8 inches) seems to be a "sweet spot." At those dimensions, the length is long enough that the linear errors in affixation of base 210 to shaft 110 translate into sufficiently small angular errors. As dimensions get larger, mass and resilience of the device tend to damp the tactile feel as the magnet "bites" the surface of the shaft.

Alternative configurations for the contact points may be curved, semicircular, or rollers, to provide touches at tangent points between the shaft surface and the base contacts. These may be more applicable for smaller-diameter shafts. For shafts below 10 inches in diameter, point contacts may be adequate. As shaft diameters increase above 10 inches, to 15, 20, 25, 30, 35, 40, 45, and 50 inches, the advantage of linear contact increases.

Fixed linear contacts may provide friction with the shaft surface that improves stability of the mounting. Rollers and smaller-contract rounded contacts may lack this frictional contact to prevent the small perturbations or gravitational sag that would disturb readings.

Magnetic affixation may be desirable, because magnets have a continuous character. A tension mechanism that may be tightened with a threaded tension nut may also be desirable. In contrast, mechanical connections based on chains and gears have a character that varies over the length of each chain link or gear tooth. In an application where high precision is essential, it may be preferred to avoid such variability.

The components of base 210 and brackets 200 may be designed to reduce internal resilience and play, to provide rigidity and consistent orientation of laser unit 102 and sensor unit 104 as they are moved from position to position along the circumference of the shaft or coupling. The rods and rod holders should be stiff enough that the weight of laser unit 102 and sensor unit 104 introduce no measurable "sag" as the device is rotated. If laser unit 102 and/or sensor unit 104 is slightly non-parallel or non-perpendicular relative to its base, the user can identify bad points using software in computer 122 to subtract it out, so long as the error is stable and consistent. While high precision of angle and dimension may be desirable, they are less crucial than rigidity and consistency.

IV. An Operational Use Case

FIGS. 4A to 4I show an operational use case.

Figure 4A:
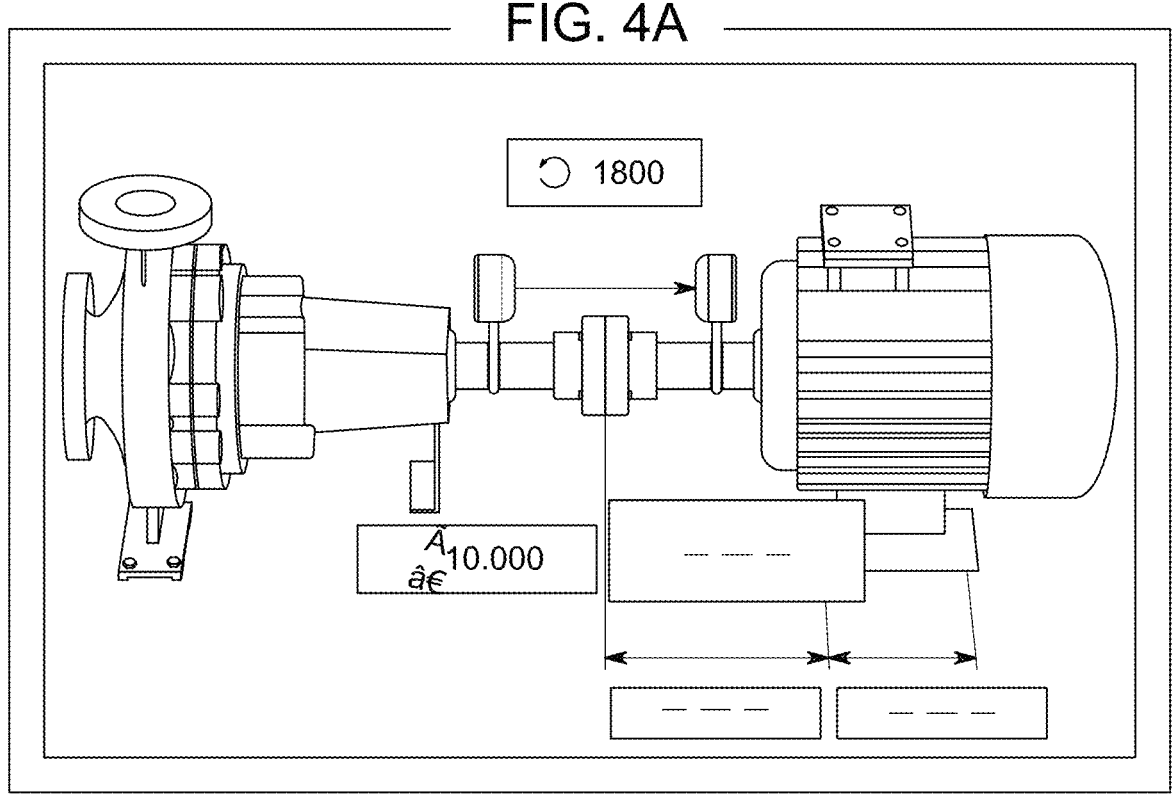

Referring to FIG. 4A, before measurements begin, various measurements are taken, and entered into computer 122. These measurements may be precise to ordinary measuring-tape precision, for example, to the nearest ⅛ inch (3 mm). For use cases using the Prüftechnik laser system, the following measurements may be taken and entered into computer 122:

coupling diameter the axial distance from the coupling center to the sensor the axial distance from the coupling to the front foot of the bearing, motor, etc. (the front point at which shims would be inserted to change the alignment of the shaft)

the axial distance foot-to-foot of the bearing, motor, etc. (the distance between the front shim point and rear shim point)

For other laser devices with fewer capabilities for self-calibration, other dimensions may be measured and entered:

the diameter of the coupling (or whatever surface laser unit 102 and sensor unit 104 will be placed on), about 34 inches in the example of FIGS. 4B to 4I.

the height of the laser beam and sensor unit 104 receptor aperture above the coupling, about two inches in the configuration of FIGS. 2C and 2D, or about seven inches in the example of FIGS. 4B to 4I.

in an alternative, the two preceding measurements may be combined an entered into computer 122 as the distance from the shaft center to the laser beam and shutter aperture, about 32 inches in the example of FIGS. 4B to 4I.

the gap between the coupling, about 1 inch in the example of FIGS. 4B to 4I.

Figure 4B:
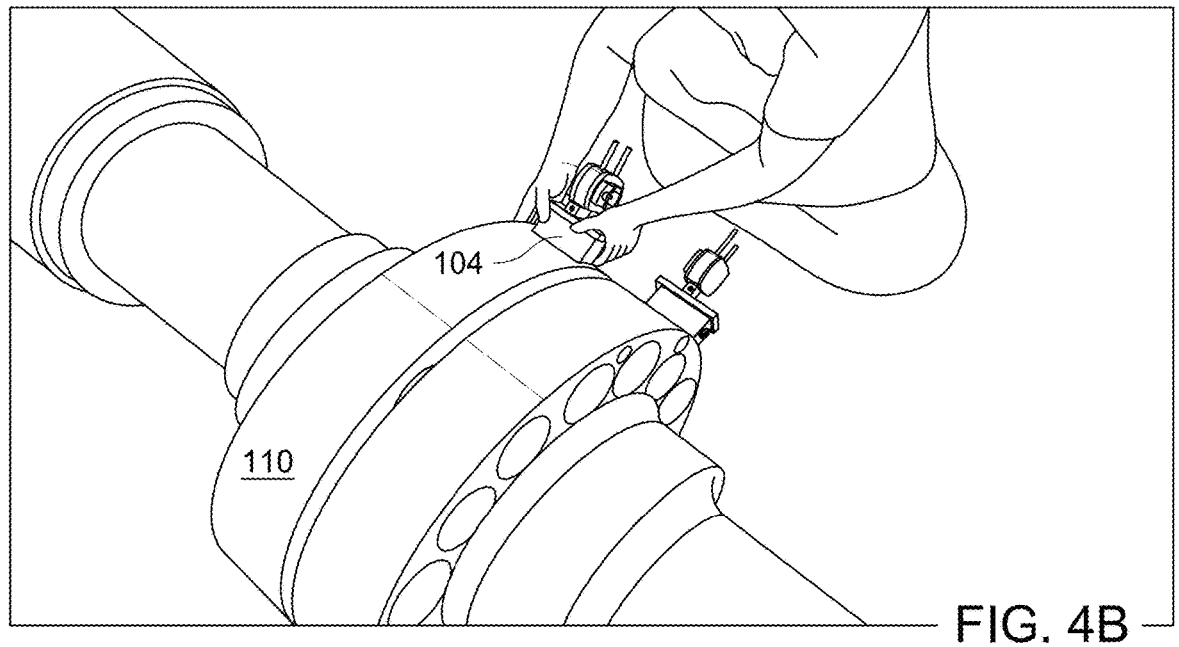

Referring to FIG. 4B, a measurement begins by placing sensor unit 104 on its coupling hub 110. Magnetic base 210 is placed slightly skewed or crooked, with the magnet turned off. When the magnet is turned on, the human can feel it pull, and can twist base 210 until the V-groove 220 or rails 242 on the base "bites" or "clicks" to the surface of the shaft or coupling when it becomes perfectly parallel to the shaft rotational center.

Because of this askew-and-adjust placement, it may be desirable to position the mounting rods to hold the emission lens of laser unit 102 and aperture lens of sensor unit 104 over the center of magnetic base 210. If the lenses are centered (or, as a proxy, if the entire laser unit 102 and sensor unit 104 are centered) over their respective mounting bases, then as each base is twisted and adjusted to "bite" and align with the shaft surface, then the relevant components only change angle, not location. This eases the tasks of trial-and-error alignment.

Figure 4C:
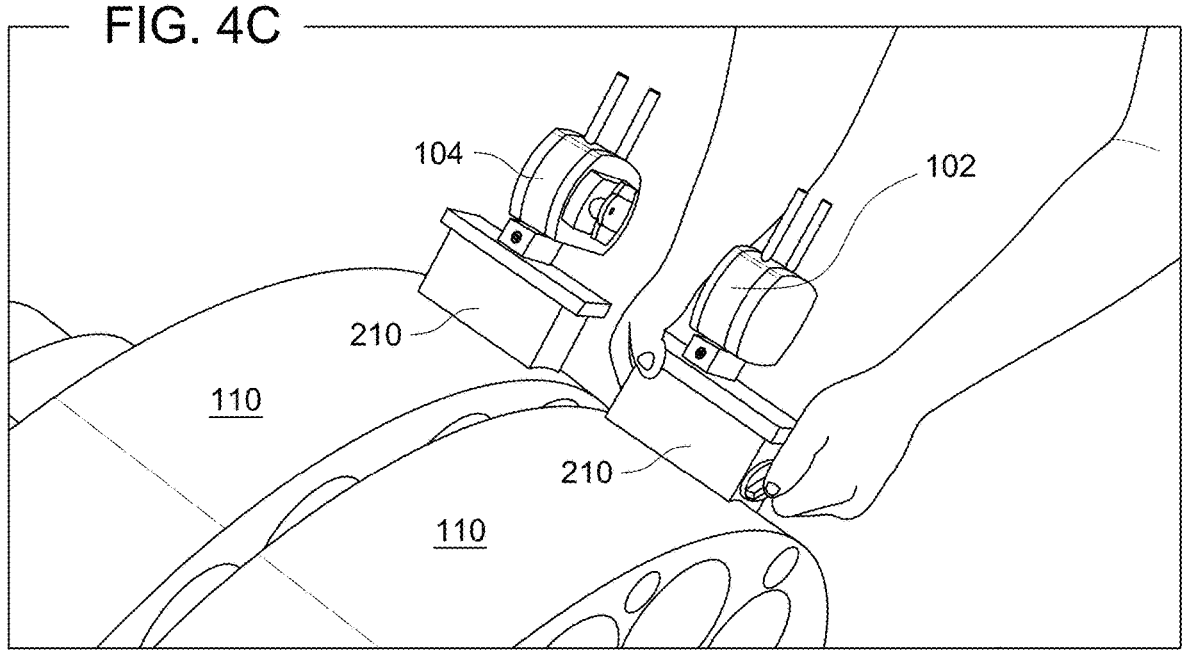

Referring to FIG. 4C, next, laser unit 102 is positioned on the opposite coupling. First, the laser beam dot is positioned to just miss the center of the shutter on sensor unit 104. On the shutter there is a small circle in raised plastic and that is the center of x and y detectors of sensor unit 104. While maintaining the laser beam on the shutter center, the human lines up laser unit 102 and turns on the magnet and twists it to "bite" the surface of the shaft to lock the laser beam into place on the sensor aperture. If positional guesses were accurate, then the twisting of laser unit 102 puts the laser beam spot exactly in the center of the shutter, over the sensor aperture lens. The user may also set the laser side first, then adjust the sensor second to line them up. This method may be preferred when measuring through bolt-holes of the couplings.

Referring to FIG. 4D, once both units 102, 104 are locked into place by their respective magnetic bases 210, the human slides back the shutter on sensor unit 104.

Referring to FIG. 4E, computer screen 122 shows that the laser beam is hitting the sensor unit's detector on center. On the right side of the screen, several angles are shown, reflecting readings of the inclinometers internal to laser unit 102 and sensor unit 104. In the lower center of the screen of FIG. 4E, a red semicircle with a blue center wedge shows the angle of incidence of the laser beam, and the blue wedge represents the 2° range of permissible incidence angles. If the white needle falls within the blue wedge, this indicates that the laser beam is sufficiently aligned to allow a measurement reading. If all the alignments are within the measurement range of the device to allow a meaningful reading, then computer 122 displays a circle-M in the center of the screen to indicate that the sensor's detector can see the laser beam, and that the laser beam and sensor detector are aligned to take a measurement point. The human provides a finger touch, and computer 122 captures the measurement point. Other alignment systems may have a different method of collecting data points.

Figure 4F:
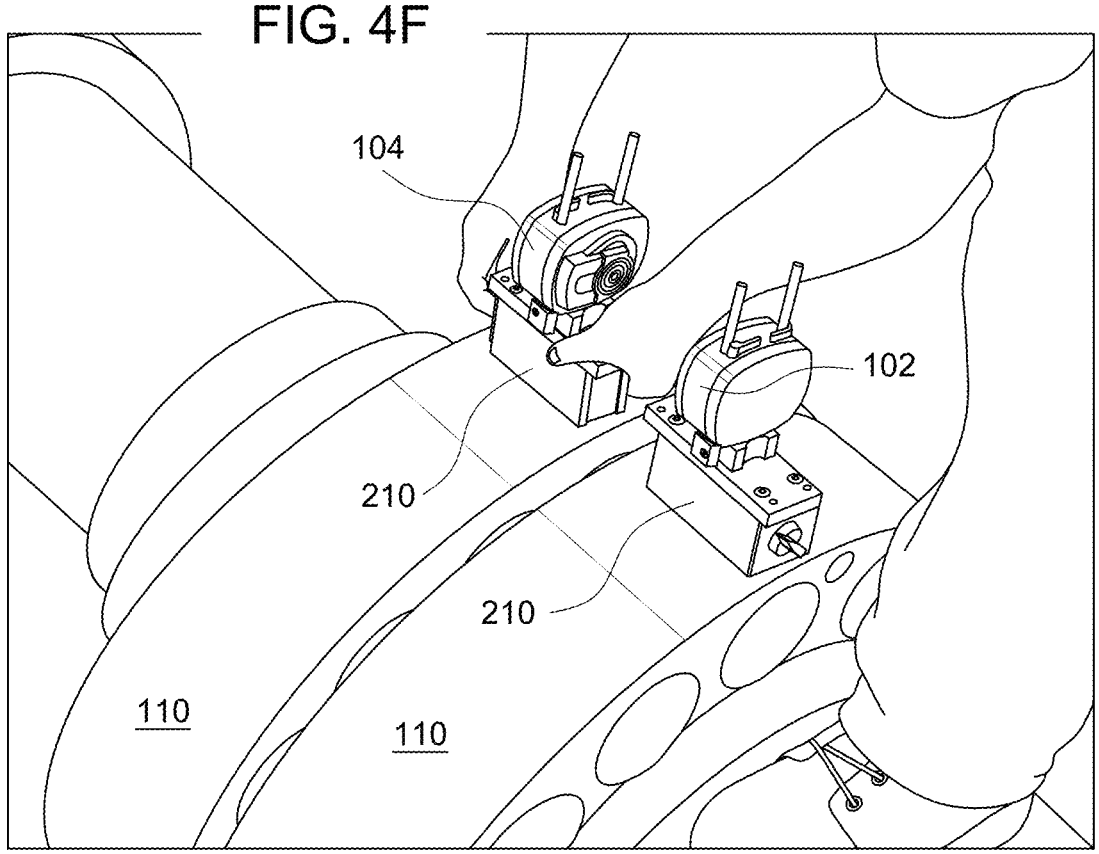
Figure 4G:
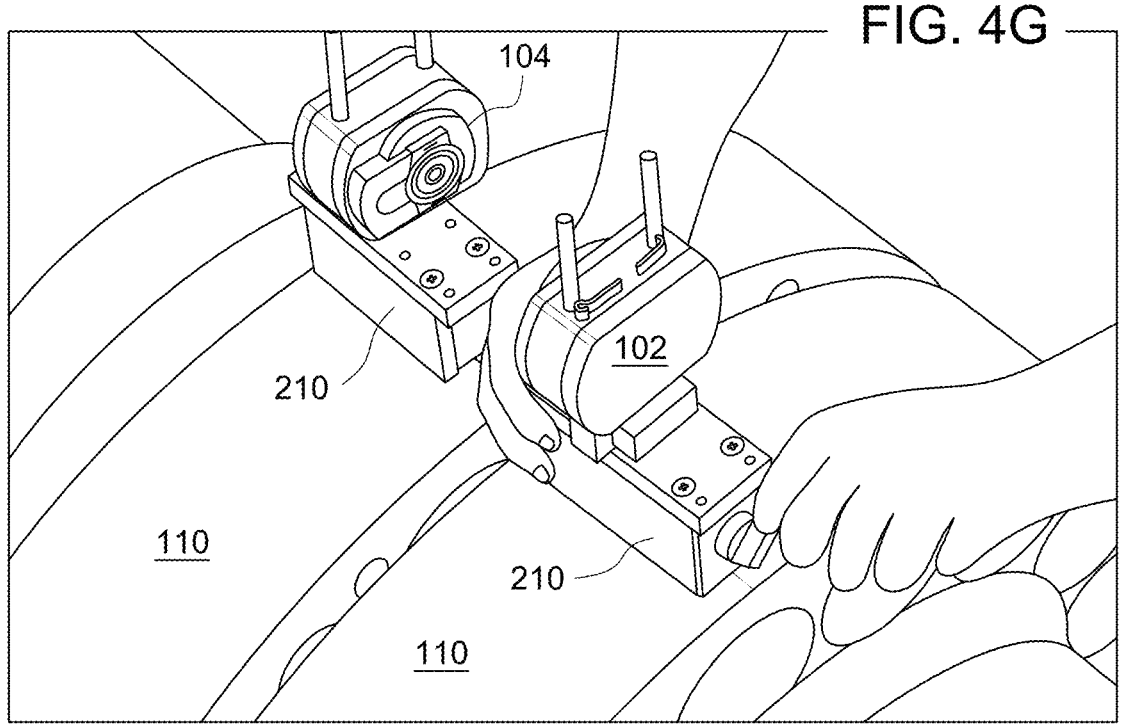

Referring to FIG. 4F, with the first measurement point completed, the human unlocks sensor unit 104 by turning the magnet off, and then physically moves laser unit 102 and sensor unit 104 to new positions on the shaft or coupling circumference. There is no requirement for any exact distance, because the inclinometers interior to the laser unit 102 and sensor unit 104 will detect the new angle and compensate. The distance should be enough so to cover the total circumference by a sufficient number of measurement points. Again, three may be mathematically sufficient, if the devices are known to be perfect. More measurement points may provide additional precision, redundancy to compensate for measurement errors, and reduce the number of adjustments required.

Figure 4H:
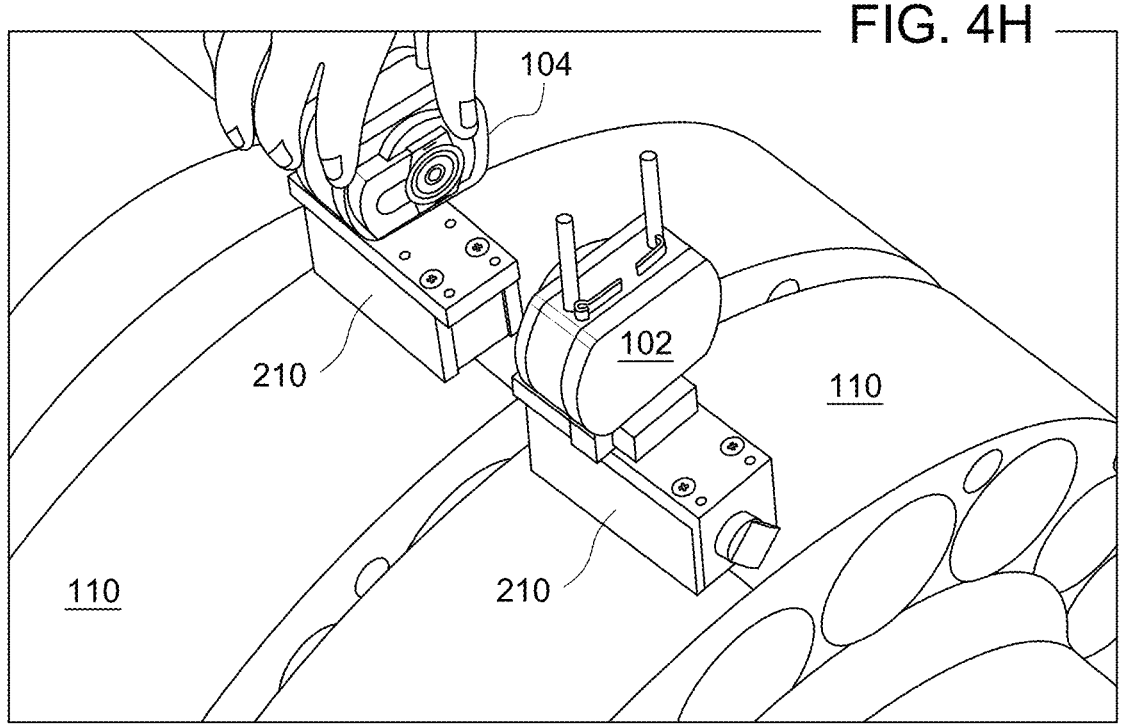

The process repeats: first, sensor unit 104 is moved, and placed against the shaft circumference slightly askew, then the base's locking magnet is turned on, then sensor unit 104 is turned until the human feels the linear contacts bite. Then, the human unlocks the laser unit's magnet, moves laser unit 102 into position (FIG. 4G) so that laser unit 102 is positioned slightly askew and the laser beam hits sensor unit 104 slightly off the center circle of the sensor's shutter, then the human turns on the laser unit base's magnet. Then the human twists base 210 for laser unit 102 until it bites, and hopefully the laser beam hits the center circle of the sensor unit's shutter (FIG. 4H). Position and orientation of laser unit 102 may be readjusted until the position and angle all line up with the laser beam on the center of the circle on the sensor's shutter.

Once everything is lined up, then (FIG. 4I) the human slides back the shutter on sensor unit 104, and the circle-M on computer screen 122 indicates that the laser beam, image detector in sensor unit 104, and computer 122 are ready for a next measurement point.

Computer 122 will tell when each reading has been recorded, and how many degrees of arc of the shaft are covered by the measurements. The whole process is repeated over the whole exposed rim of the coupling, until further measurements are blocked by the turbine casing or the full 360° is covered.

Referring again to FIG. 4E, when a sufficient number of measurements have been taken over a sufficient extent of the shaft circumference, computer screen 122 will show a blue checkmark at the lower right of the screen. The human may then touch that blue check mark to tell computer 122 that measurements are complete.

The human may take a second set or several sets of measurements as a repeatability check to make sure the measurements are consistent.

When computer 122 and human are satisfied, then computer 122 may display a result screen to allow the human to review a computed misalignment result. Computer 122 may display a vertical offset, a horizontal offset, and horizontal and vertical angularity or gaps/diameter.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

The invention claimed is:

1. An apparatus, comprising:
two bases, each having two linear contact edges designed to engage with a circumferential surface of a shaft and to ensure alignment between the base and an axis of rotation of the shaft to within a tolerance compatible with alignment tolerances of the shaft, each of the two linear contact edges including at least two terminal end regions and a center region together defining a line contact at linear intersection of two surfaces meeting at a non-zero angle; and
brackets attached to the bases designed to securely and reproducibly position laser photoelectric devices relative to the axis of rotation of the shaft, the photoelectric devices designed to measure shaft misalignment.

2. The apparatus of claim 1, wherein:
a bottom surface of at least one of the two bases having been modified from its commercially-delivered condition to provide raised rails with the line contact.

3. The apparatus of claim 1, wherein:
the laser photoelectric devices include a laser unit and sensor unit of a single laser system.

4. The apparatus of claim 1, wherein:
the laser photoelectric devices include a laser units of a dual laser system.

5. The apparatus of claim 1, wherein:
the brackets being designed to allow affixation of the respective laser photoelectric device at a range of heights, the low end of the range having the respective laser electronic device with its bottom surface touching or nearly touching the surface of the shaft, the upper end of the range holding the respective laser electronic devices with its bottom surface at three inches above the surface of the shaft.

6. The apparatus of claim 1, wherein:
the bases being magnetic, with on/off switches to apply or withdraw magnetic flux for affixation or release of the base from the shaft.

7. The apparatus of claim 1, wherein:
the bases having mechanical elements designed to successively affix and release the base to and from the shaft.

8. A method, comprising the steps of:
attaching to circular faces of two shaft segments, two devices:
each of the two devices having an engagement surface designed to engage with a circumferential surface of a shaft, each having two linear contact edges designed to engage with a circumferential surface of a shaft and to ensure alignment between the device and an axis of rotation of the shaft to within a tolerance compatible with alignment tolerances of the shaft, each of the two linear contact edges including at least two terminal end regions and a center region together defining a line contact at linear intersection of two surfaces meeting at a non-zero angle; and each of the two devices having a laser photoelectric device for ascertaining a dimension of displacement of the two shafts from a desired axis of rotation relative to each other the attaching including attaching the devices at several points on the circular faces on the shaft with no rotation of the shaft between attachments, each attachment using tactile feedback as the linear contact edges of the engagement surfaces bite the circumferential surfaces of the shaft segments, to assure parallel mounting.

9. The method of claim 8, further comprising:

a base unit, the base providing at least one of the engagement surfaces and a bracket designed to mount and hold the laser photoelectric device in alignment relative to the line contact.

10. The method of claim 9, wherein:

a bottom surface of at least one of the two bases having been modified from its commercially-delivered condition to provide raised rails designed to improve tactile feedback of to a user of the alignment between the base and an axis of rotation of the shaft.

11. The method of claim 9, wherein:

the base has affixed thereto two rails designed to improve tactile feedback of to a user of the alignment between the base and an axis of rotation of the shaft.

12. The method of claim 8, wherein:

the laser photoelectric devices include a laser unit and sensor unit of a single laser system.

13. The method of claim 8, wherein:

the laser photoelectric devices include a laser units of a dual laser system.

14. The method of claim 8, wherein:

the brackets are designed to allow affixation of the respective laser photoelectric device at a range of heights, the low end of the range having the respective laser electronic device with its bottom surface touching or nearly touching the surface of the shaft, the upper end of the range holding the respective laser electronic devices with its bottom surface at three inches above the surface of the shaft.

15. The method of claim 8, wherein:

the bases are magnetic, with on/off switches to apply or withdraw magnetic flux for affixation or release of the base from the shaft.

16. The method of claim 8, wherein:

the bases have mechanical elements designed to successively affix and release the base to and from the shaft.

* * * * *